United States Patent
Lee et al.

(10) Patent No.: US 10,611,302 B2
(45) Date of Patent: Apr. 7, 2020

(54) HYBRID VEHICLE CONTROL METHOD FOR CONTROLLING VEHICLE NOISE

(71) Applicants: HYUNDAI MOTOR COMPANY, Seoul (KR); KIA Motors Corporation, Seoul (KR)

(72) Inventors: Dong Chul Lee, Anyang-si (KR); In Soo Jung, Suwon-si (KR)

(73) Assignees: HYUNDAI MOTOR COMPANY, Seoul (KR); KIA Motors Corporation, Seoul (KR)

(\*) Notice: Subject to any disclaimer, the term of this patent is extended or adjusted under 35 U.S.C. 154(b) by 185 days.

(21) Appl. No.: 15/823,204

(22) Filed: Nov. 27, 2017

(65) Prior Publication Data
US 2019/0118707 A1    Apr. 25, 2019

(30) Foreign Application Priority Data
Oct. 23, 2017  (KR) .......................... 10-2017-0137388

(51) Int. Cl.
   *B60Q 5/00*   (2006.01)
   *B60L 3/12*   (2006.01)

(52) U.S. Cl.
   CPC ............. *B60Q 5/008* (2013.01); *B60L 3/12* (2013.01); *B60L 2270/42* (2013.01)

(58) Field of Classification Search
   CPC ..................................................... B60L 3/12
   USPC ...................................................... 701/22
   See application file for complete search history.

(56) References Cited

U.S. PATENT DOCUMENTS

| 8,730,020 | B2 * | 5/2014 | Konet | G10K 15/02 340/384.1 |
| 2012/0050020 | A1 * | 3/2012 | Konet | G10K 15/02 340/384.1 |
| 2013/0144474 | A1 * | 6/2013 | Ricci | H04W 4/90 701/22 |
| 2014/0328494 | A1 * | 11/2014 | Pommerer | H04R 1/028 381/86 |
| 2016/0010574 | A1 * | 1/2016 | Kumar | B60L 50/10 701/104 |

(Continued)

FOREIGN PATENT DOCUMENTS

| JP | 2014-118815 A | 6/2014 |
| JP | 2015-229403 A | 12/2015 |

(Continued)

*Primary Examiner* — Thomas G Black
*Assistant Examiner* — Luat T Huynh
(74) *Attorney, Agent, or Firm* — McDonnell Boehnen Hulbert & Berghoff LLP

(57) ABSTRACT

A control method for a hybrid vehicle having an engine and a motor as driving power sources includes the steps f: checking, by a controller, a driving mode of the hybrid vehicle in real-time; when the driving mode of the hybrid vehicle is a motor driving mode (electric vehicle mode: EV mode), outputting, by the controller, a first sound profile to a sound device of the hybrid vehicle, the first sound profile being calculated by the controller based on a motor RPM and a motor load; and when the driving mode of the hybrid vehicle is an engine driving mode (hybrid electric vehicle mode: HEV mode), outputting, by the controller, a second sound profile to the sound device of the hybrid vehicle, the second sound profile being calculated by the controller based on engine operation sounds.

7 Claims, 2 Drawing Sheets

(56) References Cited

U.S. PATENT DOCUMENTS

2017/0351480 A1* 12/2017 MacNeille .............. G06F 3/165
2018/0315413 A1* 11/2018 Lee .......................... H04R 3/04

FOREIGN PATENT DOCUMENTS

| | | | |
|---|---|---|---|
| JP | 3206341 | U | 8/2016 |
| KR | 10-2013-0057851 | A | 6/2013 |
| KR | 10-1271865 | B1 | 6/2013 |
| KR | 10-2013-123227 | A | 11/2013 |
| KR | 10-2014-120805 | A | 10/2014 |
| KR | 20140120805 | A * | 10/2014 |
| KR | 10-1468776 | B1 | 12/2014 |

* cited by examiner

HYBRID VEHICLE CONTROL METHOD FOR CONTROLLING VEHICLE NOISE

CROSS REFERENCE TO RELATED APPLICATION

The present application claims priority to and benefit of Korean Patent Application No. 10-2017-0137388, filed Oct. 23, 2017, the entire contents of which is incorporated herein for all purposes by this reference.

BACKGROUND

Technical Field

The present disclosure relates generally to a hybrid vehicle control method, wherein the method controls interior and/or exterior vehicle sounds based on the driving mode of the vehicle to improve the driving experience for a driver and reduce the likelihood of accidents.

Description of the Related Art

Recently, due to the introduction of vehicles such as hybrid vehicles that use both fossil fuel and a battery as driving power sources, and electric vehicles that use a battery as a driving power source, installation of a sound-generating device in an eco-friendly vehicle has become mandatory because these types of vehicles generate little sound.

In the United States, legislation is being enacted requiring that an eco-friendly vehicle generate noise above a certain level.

In general, vehicle noise, lack of vehicle noise, or monotonous vehicle noise may be unpleasant for a driver. In addition, pedestrians may find vehicle noise unpleasant. However, vehicle noise may prevent accidents because pedestrians audibly recognize the proximity of a nearby vehicle through such a noise.

In addition, silence or monotone noise within a hybrid vehicle has a negative impact on a driver. For example, during a motor driving mode, because there is no unique sound from an internal combustion engine, the driving experience may be degraded or the driver may risk falling asleep. In addition, there may be driving discomfort generated during regenerative braking.

The foregoing is intended merely to aid in the understanding of the background of the present invention, and is not intended to mean that the present invention falls within the purview of the related art that is already known to those skilled in the art.

SUMMARY OF THE DISCLOSURE

The present disclosure addresses the above problems by providing a hybrid vehicle control method in which the interior sound for the hybrid vehicle is consistently maintained. In detail, discomfort arising from the lack of a vehicle noise or from the presence of a continuous monotone noise generated while the driver drives the hybrid vehicle may be prevented by creating and outputting different sound profiles based on the driving mode of the vehicle.

In order to achieve the above object, in an example embodiment, a control method for a hybrid vehicle using an engine and a motor as driving power sources includes the following steps: checking, by a controller, a driving mode of the hybrid vehicle in real-time; when the driving mode of the hybrid vehicle is a motor driving mode (electric vehicle mode: EV mode), outputting, by the controller, a first sound profile to a sound device of the hybrid vehicle, the first sound profile being calculated based on a motor RPM and a motor load; and when the driving mode of the hybrid vehicle is an engine driving mode (hybrid electric vehicle: HEV mode), outputting, by the controller, a second sound profile to the sound device of the hybrid vehicle, the second sound profile being calculated based on engine operation sounds. The engine operation sounds include components of the sounds generated by revolution of the engine classified according to frequency of the sounds.

The first sound profile may be a virtual engine sound pre-mapped according to the motor revolution per minute (RPM) and the motor load.

In calculating and outputting the first sound profile, the controller may measure the interior noise of the hybrid vehicle by using a microphone; calculate the first sound profile based on the measured interior noise, the motor RPM and the motor load; and output the calculated first sound profile to the sound device of the hybrid vehicle.

The engine operation sounds may be calculated by using any of a vibration sensor, a pressure sensor, an exhaust pressure sensor, and a boost pressure sensor.

In calculating and outputting the second sound profile, the controller may calculate the second sound profile that induces the calculated engine operation sounds to respectively reach target sound pressure levels.

In calculating and outputting the second sound profile, the controller may calculate the second sound profile based on any of an engine RPM, a gear stage, an APS sensing value, and the engine operation sounds, and output the calculated second sound profile to the sound device of the hybrid vehicle.

In calculating and outputting the second sound profile, the controller may measure the interior noise of the hybrid vehicle by using a microphone, reflect a sound profile that removes the interior noise in the second sound profile when a sound pressure of the measured interior noise is equal to or greater than a target sound pressure, and output the reflected second sound profile to the sound device of the hybrid vehicle.

When the driving mode is switched from the engine driving mode (HEV mode) to the motor driving mode (EV mode), or the driving mode is switched from the motor driving mode (EV mode) to the engine driving mode (HEV mode), the method may further include the steps of: causing the controller to gradually alter the sound profile to correspond to the change in driving mode.

According to the hybrid vehicle control method configured as described above, the driving experience of the driver may be improved by providing a vehicle sound suitable for each driving mode of the hybrid vehicle that uses the engine and the motor as driving power sources.

In addition, sound pressure of the hybrid vehicle is gradually changed when the driving mode of the hybrid vehicle is switched, thus preventing discomfort caused by changes in the vehicle sound generated when the driving mode is switched.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Herein below, example embodiments of a hybrid vehicle control method will be described in detail with reference to the accompanying drawings.

Figure 1:
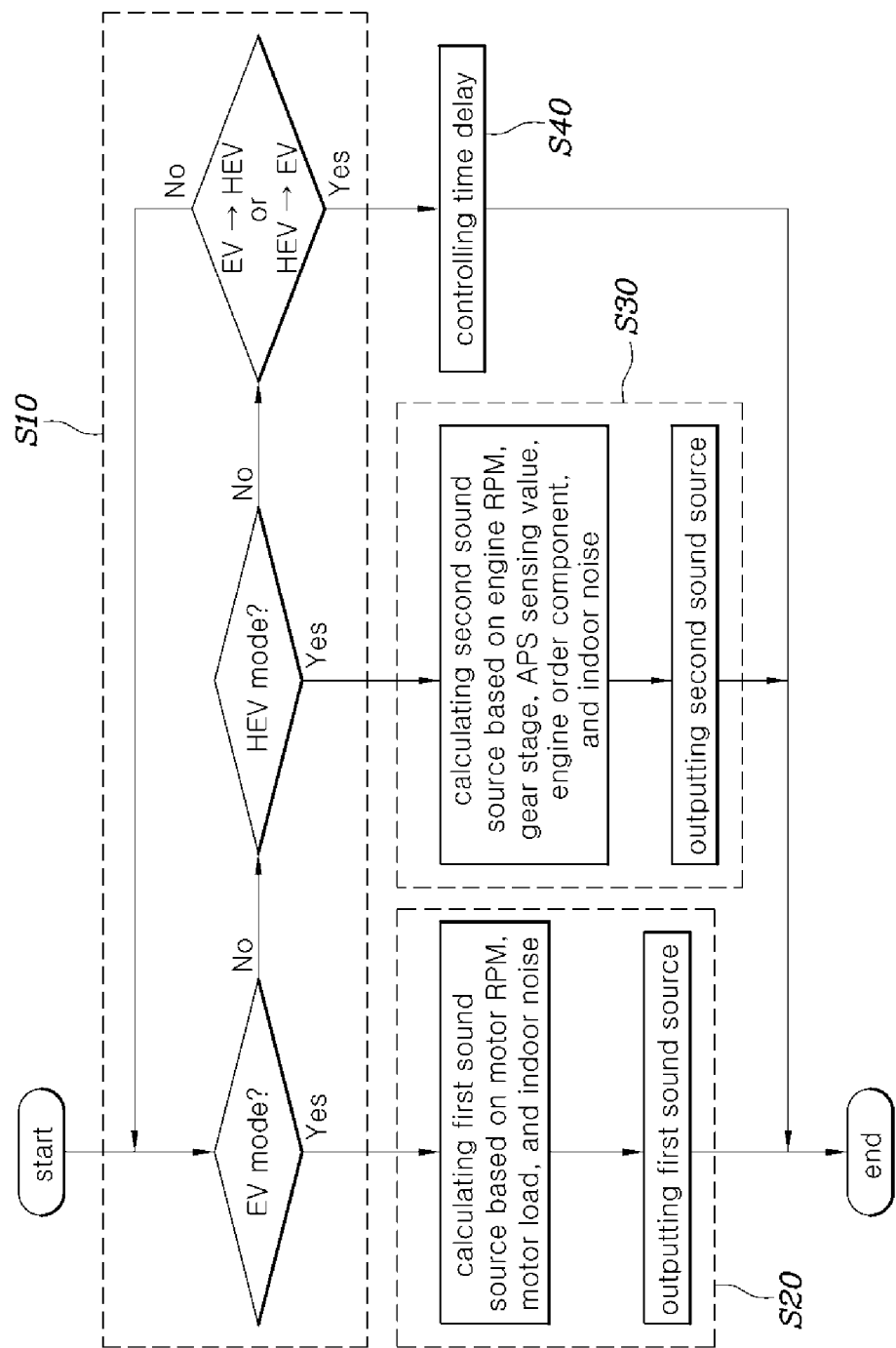
FIG. 1 is a flowchart showing a hybrid vehicle control method according to an example embodiment.
Figure 2:
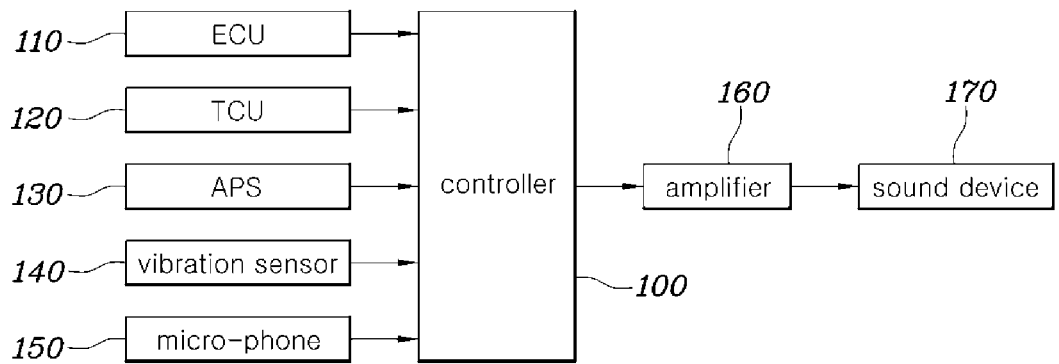
FIG. 2 is a block diagram of a hybrid vehicle control apparatus according to an example embodiment.

FIG. 1 is a flowchart showing a hybrid vehicle control method according to an example embodiment, and FIG. 2 is a block diagram of a hybrid vehicle control apparatus according to an example embodiment.

Referring to FIG. 1 and FIG. 2, the example hybrid vehicle control method, wherein the hybrid vehicle includes an engine and a motor as driving power sources, include the steps of: step (S10) of checking, by the controller 100, a driving mode of the hybrid vehicle; step (S20) of outputting, by controller 100, a first sound profile to a sound device 170 of the hybrid vehicle when the driving mode is a motor driving mode (EV mode); and step (S30) of outputting, by controller 100, a second sound profile to sound device 170 of the hybrid vehicle when the driving mode is an engine driving mode (HEV mode) engine operation sound. The first sound profile is calculated by controller 100 based on a motor RPM and a motor load, and the second sound profile is calculated by controller 100 based on an engine operation sound.

The hybrid vehicle may be a transmission mounted electric device ("TMED") type of hybrid vehicle including, sequentially, an engine, an engine clutch, a motor, a transmission, a differential gear, and driving wheels. Therefore, in an EV mode (i.e. a motor driving mode), the hybrid vehicle may use the motor as the driving power source, and in an HEV mode (i.e. an engine driving mode), the motor may be regeneratively controlled while the engine is used as the driving power source.

Controller 100 checks the driving mode of the hybrid vehicle in real-time in step (S10), and determines whether to adjust the interior sound profile or the exterior sound profile of the hybrid vehicle.

When the driving mode of the hybrid vehicle is a motor driving mode (EV mode), the engine stops operating, and both the interior and exterior sounds generated by the engine cease. Noise generated by operating the motor is minimal and, as a result, the interior of the hybrid vehicle becomes silent. However, because a continuous sound is monotonous, it may degrade the driving experience of the driver and also may lead the driver becoming drowsy while driving.

Therefore, in the example embodiment, controller 100 outputs a first sound profile calculated based on the motor RPM and the motor load to sound device 170 so that the driving experience of the driver is actively controlled even in an EV mode.

In an example embodiment, the first sound profile is a virtual engine sound that is pre-mapped according to the motor RPM and the motor load.

In other words, controller 100 receives motor RPM information from a speed sensor monitoring the rotation speed of the motor, and calculates a virtual engine RPM by using the received motor RPM. In general, in a TMED type vehicle, the motor and the engine are operated at a ratio of 1:1, and it therefore may be assumed that a motor RPM is a virtual engine RPM. A virtual engine sound profile is estimated based on the virtual engine RPM calculated as above, and the estimated virtual engine sound profile is reflected in the first sound profile so that the driver may experience an engine sound corresponding to the vehicle driving state even in an EV mode.

In addition, a motor torque may be mapped with an engine torque, and a weight with respect to the motor torque may be applied to the first sound profile so that an engine sound consistent with vehicle acceleration is generated. Thus, a vehicle sound may be provided within the hybrid vehicle in association with the vehicle driving state.

In a preferred embodiment, sound device 170 is a speaker and is provided in at least one of the inside of the hybrid vehicle, the vehicle engine compartment, and the exterior of the hybrid vehicle. Thus, sound device 170 may provide the driver with an improved driving experience during an EV mode, and may also help a pedestrian to recognize the proximity of a nearby hybrid vehicle so that a vehicle accident may be prevented.

In step (S20), controller 100 measures the interior noise of the hybrid vehicle by using a microphone 150, and outputs a first sound profile calculated based on the measured interior noise, the motor RPM, and the motor load to sound device 170 of the hybrid vehicle.

Microphone 150 may transmit the measured interior noise of the hybrid vehicle to controller 100 so that an interior sound of the hybrid vehicle may be monitored. Accordingly, controller 100 may output a sound profile having the opposite phase of the monitored internal sound so that the interior noise may be removed, or may control so that a required sound profile is applied to the first sound profile.

Therefore, even when the hybrid vehicle is in an EV mode, the driving experience of the driver may be improved by outputting a virtual sound profile representing driving performance.

Meanwhile, when the driving mode is an engine driving mode (HEV mode), controller 100 outputs to sound device 170 a second sound profile calculated based on an engine operation sound.

The engine operation sound refers to a sound component generated when the engine operates, and may be a factor calculated by a vibration sensor 140 provided in an engine side. Alternatively, the engine operation sound may be calculated from an exhaust pressure sensor or a boost pressure sensor. In other words, various types of data may be used for extracting the operation sound of the operating engine.

In one embodiment, when controller 100 calculates the engine operation sounds by using the vibration sensor 140, the engine operation sounds generated by the rotation are included in a vibration component of the engine, the engine operation sounds are distinguished by an arrangement thereof and difference in respective sound pressure levels.

Herein, in step (S30), controller 100 may calculate a second sound profile that causes the calculated engine operation sounds to reach respective target sound pressure levels.

In other words, each arrangement of the engine operation sounds has a sound pressure level. When the driving mode of the hybrid vehicle is an HEV mode, the level or pressure of a specific engine operation sound is amplified by an amplifier 160 according to the driving situation of the hybrid vehicle, and the amplified level is output to sound device 170 to acoustically optimize the dynamic driving experience of the hybrid vehicle for the driver.

In one embodiment, in an a six-cylinder engine, a third, a fourth, a four-and-a-half, a sixth, an eighth, and a ninth component among the vibration components of the engine are extracted, and the extracted components are amplified to respective target sound pressure levels. The amplified components are output to sound device 170 so that the interior sound of the hybrid vehicle is enhanced.

In detail, in step (S30), controller 100 may calculate the second sound profile based on an engine RPM, a gear stage, an accelerator pedal sensor ("APS") sensing value, and an engine operation sound, and output the calculated second sound profile to sound device 170 of the hybrid vehicle.

In other words, in addition to proving the driver with a dynamic driving experience according to an engine characteristic based on the engine operation sound, controller 100 may improve the driving experience of the driver by reflecting a weighted function in the second sound profile. The weighted function is used for providing an acceleration experience to the driver suitable according to the engine RPM, and the APS sensing value. In addition, a weighted function may be reflected in the second sound profile, wherein the weighted function is used for providing a suitable transmission experience of the hybrid vehicle corresponding to a gear stage change.

Herein, controller 100 receives engine RPM information from an engine control unit 110 ("ECU"), receives gear stage information from a transmission control unit 120 ("TCU"), and receives acceleration pedal opening rate information from an accelerator pedal sensor 130. Meanwhile, controller 100 may be separately provided with ECU 110 as shown in FIG. 2, or may be included in ECU 110.

In addition, in step (S30), controller 100 measures the interior noise of the hybrid vehicle by using microphone 150, applies a specific sound profile to the second sound profile when a sound pressure of the measured interior noise is equal to or greater than a target sound pressure, and outputs second sound profile to sound device 170.

In other words, when the driving mode of the hybrid vehicle is an HEV mode, the interior noise generated within the hybrid vehicle may be detected by microphone 150. The controller may receive and analyze interior noise information measured by microphone 150, apply a sound profile having a phase opposite to the interior noise in the second sound profile when the sound pressure of the interior noise exceeds a preset target sound pressure, and output the second sound profile to sound device 170, thereby canceling the interior noise of the hybrid vehicle.

Meanwhile, in step (S10), when the driving mode is switched from an engine driving mode (HEV mode) to a motor driving mode (EV mode), or from a motor driving mode (EV mode) to an engine driving mode (HEV mode), in step (S40) controller 100 gradually adjusts the sound profile to correspond to the change in driving mode.

In other words, vehicle noise differs significantly between EV mode and HEV mode. Accordingly, when the driving mode is switched, the driver may feel discomfort while driving by sensing such a sound difference. In an example embodiment, the pressure of the sound profile of the hybrid vehicle is controlled to gradually adjust over a predetermined period of time as the driving mode is changed. Thus, the driving experience of the driver may be improved because the driver may not sense a sound difference when the driving mode is switched.

Figure 3:
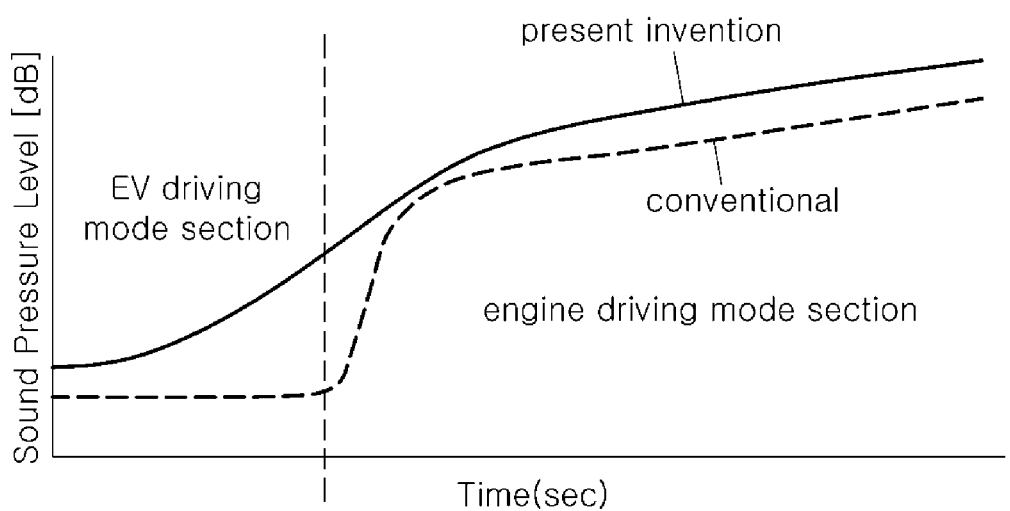
FIG. 3 is a graph showing changes in sound pressure according to an example embodiment of the hybrid vehicle control method.

FIG. 3 is a graph showing changes in sound pressure according to an example embodiment of the hybrid vehicle control method.

As shown in FIG. 3, conventionally, when the driving mode is switched from an EV mode to an engine driving mode which uses an internal combustion engine, there is big difference in sound pressure due an airborne sound transmitted from the engine. Using the embodiments described above, the sound pressure is controlled to gradually increase when the driving mode is switched from an EV mode to an HEV mode, and thus the driver may not feel discomfort due to the vehicle sound change.

In an example embodiment, controller 100 monitors the driving mode of the hybrid vehicle in real-time, and outputs the first and second sound profiles according to step (S40), and thus the interior sound of the hybrid vehicle may be actively controlled. Accordingly, merchantability of the vehicle may be improved.

According to the hybrid vehicle control method configured as described above, the driving experience of the driver may be improved by providing a vehicle sound suitable for each driving mode of the hybrid vehicle using the engine and the motor as driving power source.

In addition, the sound pressure of the hybrid vehicle is gradually changed when the driving mode of the hybrid vehicle is switched, thus discomfort due to the sound change generated when the driving mode is switched may be prevented.

Furthermore, by providing a virtual vehicle noise when the vehicle is operating in EV mode, the incidence of accidents may be reduced as pedestrians will be able to determine the proximity of a nearby hybrid vehicle.

Although example embodiments have been described for illustrative purposes, those skilled in the art will appreciate that various modifications, additions and substitutions are possible, without departing from the scope and spirit of the invention as disclosed in the accompanying claims.

What is claimed is:

1. A control method for a hybrid vehicle having an engine and a motor as a driving power source, the method comprising the steps of:
checking, by a controller, a driving mode of the hybrid vehicle in real-time;
when the driving mode of the hybrid vehicle is a motor driving mode, outputting, by the controller, a first sound profile to a sound device of the hybrid vehicle, the first sound profile being calculated based on a motor revolution per minute (RPM) and a motor load; and
when the driving mode of the hybrid vehicle is an engine driving mode, outputting, by the controller, a second sound profile to the sound device of the hybrid vehicle, the second sound profile being calculated based on engine operation sounds;
wherein in calculating and outputting of first sound profile, the controller measures an interior noise of the hybrid vehicle by using a microphone, calculates the first sound profile based on the measured interior noise, the motor RPM, and the motor load, and outputs the calculated first sound profile to the sound device of the hybrid vehicle.

2. The method of claim 1, wherein the first sound profile is a virtual engine sound pre-mapped according to the motor revolution per minute and the motor load.

3. The method of claim 1, wherein the engine operation sounds are calculated by using any one of a vibration sensor, a pressure sensor, an exhaust pressure sensor, and a boost pressure sensor.

4. The method of claim 3, wherein in calculating and outputting the second sound profile, the controller calculates the second sound profile that causes the calculated engine operation sounds to respectively reach target sound pressure levels.

5. The method of claim 1, wherein in calculating and outputting of second sound profile, the controller calculates the second sound profile based on an engine RPM, a gear stage, an accelerator pedal sensor (APS) sensing value, and the engine operation sounds, and outputs the calculated second sound profile to the sound device of the hybrid vehicle.

6. The method of claim 1, wherein in calculating and outputting of second sound profile, the controller measures an interior noise of the hybrid vehicle by using a microphone, applies a sound profile that cancels the interior noise in the second sound profile when a sound pressure of the measured interior noise is equal to or greater than a target sound pressure, and outputs the second sound profile to the sound device of the hybrid vehicle.

7. The method of claim 1, wherein when the driving mode is switched from the engine driving mode to the motor driving mode, or the driving mode is switched from the motor driving mode to the engine driving mode, the method further includes causing the controller to gradually adjust the sound pressure of the sound profile to correspond to the change in driving mode.

* * * * *